(12) United States Patent
Cui et al.

(10) Patent No.: US 12,192,933 B2
(45) Date of Patent: Jan. 7, 2025

(54) SPECIAL SCENARIO HANDLING IN SECONDARY SERVING CELL (SCELL) ACTIVATION

(71) Applicant: APPLE INC., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 421 days.

(21) Appl. No.: 17/441,870

(22) PCT Filed: Mar. 31, 2021

(86) PCT No.: PCT/CN2021/084704
§ 371 (c)(1),
(2) Date: Sep. 22, 2021

(87) PCT Pub. No.: WO2022/205194
PCT Pub. Date: Oct. 6, 2022

(65) Prior Publication Data
US 2023/0232349 A1 Jul. 20, 2023

(51) Int. Cl.
*H04W 56/00* (2009.01)
(52) U.S. Cl.
CPC ............... *H04W 56/0015* (2013.01)

(58) Field of Classification Search
CPC .................................................. H04W 56/0016
USPC ........................................................... 370/329
See application file for complete search history.

(56) References Cited

U.S. PATENT DOCUMENTS

| | | | |
|---|---|---|---|
| 10,278,184 B2 | 4/2019 | Novlan et al. | |
| 10,455,635 B2 | 10/2019 | Park et al. | |
| 2019/0253925 A1* | 8/2019 | Gholmieh | H04B 1/005 |
| 2020/0229180 A1* | 7/2020 | Liu | H04W 76/19 |
| 2021/0091897 A1* | 3/2021 | Gheorghiu | H04W 48/16 |
| 2022/0217034 A1* | 7/2022 | Han | H04J 11/0083 |
| 2022/0322375 A1* | 10/2022 | Huang | H04W 72/51 |
| 2023/0239823 A1* | 7/2023 | Liu | H04W 56/0045 |
| | | | 370/350 |
| 2023/0318784 A1* | 10/2023 | Hu | H04L 5/0051 |
| | | | 370/329 |

FOREIGN PATENT DOCUMENTS

| | | |
|---|---|---|
| WO | 2020005144 | 1/2020 |
| WO | 2020215108 | 10/2020 |

OTHER PUBLICATIONS

Article entitled, "CR on SSB Less SCell Activation for FR1 for Rel-15", 3GPP TSG-RAN WG4 Meeting #98-e 05, R4-2101071, Jan. 25-Feb. 5, 2021 in 5 pages.
(Continued)

*Primary Examiner* — Robert J Lopata
(74) *Attorney, Agent, or Firm* — Kilpatrick Townsend & Stockton LLP

(57) ABSTRACT

The present application relates to devices and components including apparatus, systems, and methods for carrier aggregation operations in wireless communication systems.

19 Claims, 16 Drawing Sheets

(56) References Cited

OTHER PUBLICATIONS

Article entitled, "Discussion on CSSF for Inter-RAT Measurement, SCell Activation Delay and Cell Identification Requirements on Deactivated SCell in Rel-15", Huawei, 3GPP TSG-RAN WG4 Meeting #98-e, R4-2102737, Jan. 25-Feb. 5, 2021, pp. 1-8.
Article entitled, "On SSB-Less SCell Activation", Apple, 3GPP TSG-RAN4 Meeting #98-e, R4-2100174, Jan. 25-Feb. 5, 2021 in 2 pages.
International Search Report and Written Opinion issued in PCT Application No. PCT/CN2021/084704, dated Jan. 6, 2022 in 9 pages.
Technical Specification entitled, "Requirements for support of radio resource management (3GPP TS 38.133 version 16.6.0 Release 16)," ETSI TS 138 133 V16.6.0 (Feb. 2021) in 1847 pages. [cited for Section 8.3.2].
International Preliminary Report on Patentability issued in PCT Application No. PCT/CN2021/084704, dated Oct. 12, 2023 in 6 pages.
Supplementary Partial European Search Report issued in European Application No. 21933857.1, dated Sep. 25, 2024 in 6 pages.
Document for: Information; entitled "Email discussion summary for [98eBis][201] NR_NewRAT RRM_Core," Source: Moderator (Huawei, HiSilicon); Agenda Item: 4.7; 3GPP TSG-RAN WG4 Meeting # 98-e-Bis; R4-2103683; Electronic Meeting, Jan. 25-Feb. 5, 2021; server date Feb. 9, 2021; downloaded by EPO on Feb. 18, 2021 in 77 pages.
Document for: Discussion; entitled "On SSB-less SCell activation," Source: Apple; Agenda Item: 4.7; 3GPP TSG-RAN4 Meeting #98-e; R4-2100174; Online, Jan. 25-Feb. 5, 2021; server date Jan. 15, 2021; downloaded by EPO on Jan. 17, 2021 in 2 pages.

\* cited by examiner

| Case ID | absoluteFrequencySSB configured or not in "DownlinkConfigCommon" for target Scell | SMTC for target Scell configured or not | UE support SSB-less Scell or not (scellWithoutSSB) |
|---|---|---|---|
| 1 | Yes | Yes | Regardless of yes or no |
| 2 | Yes | No | Regardless of yes or no |
| 3 | No | Yes | Yes |
| 4 | No | No | Yes |
| 5 | No | Yes | No |
| 6 | No | No | No |

FIG. 5

SPECIAL SCENARIO HANDLING IN SECONDARY SERVING CELL (SCELL) ACTIVATION

BACKGROUND

Carrier aggregation techniques are described in existing Third Generation Partnership Project (3GPP) networks.

BRIEF DESCRIPTION OF THE DRAWINGS

FIG. 5 shows a table that summarizes various configuration combinations for SCell activation in accordance with some embodiments.

DETAILED DESCRIPTION

Figure 1:
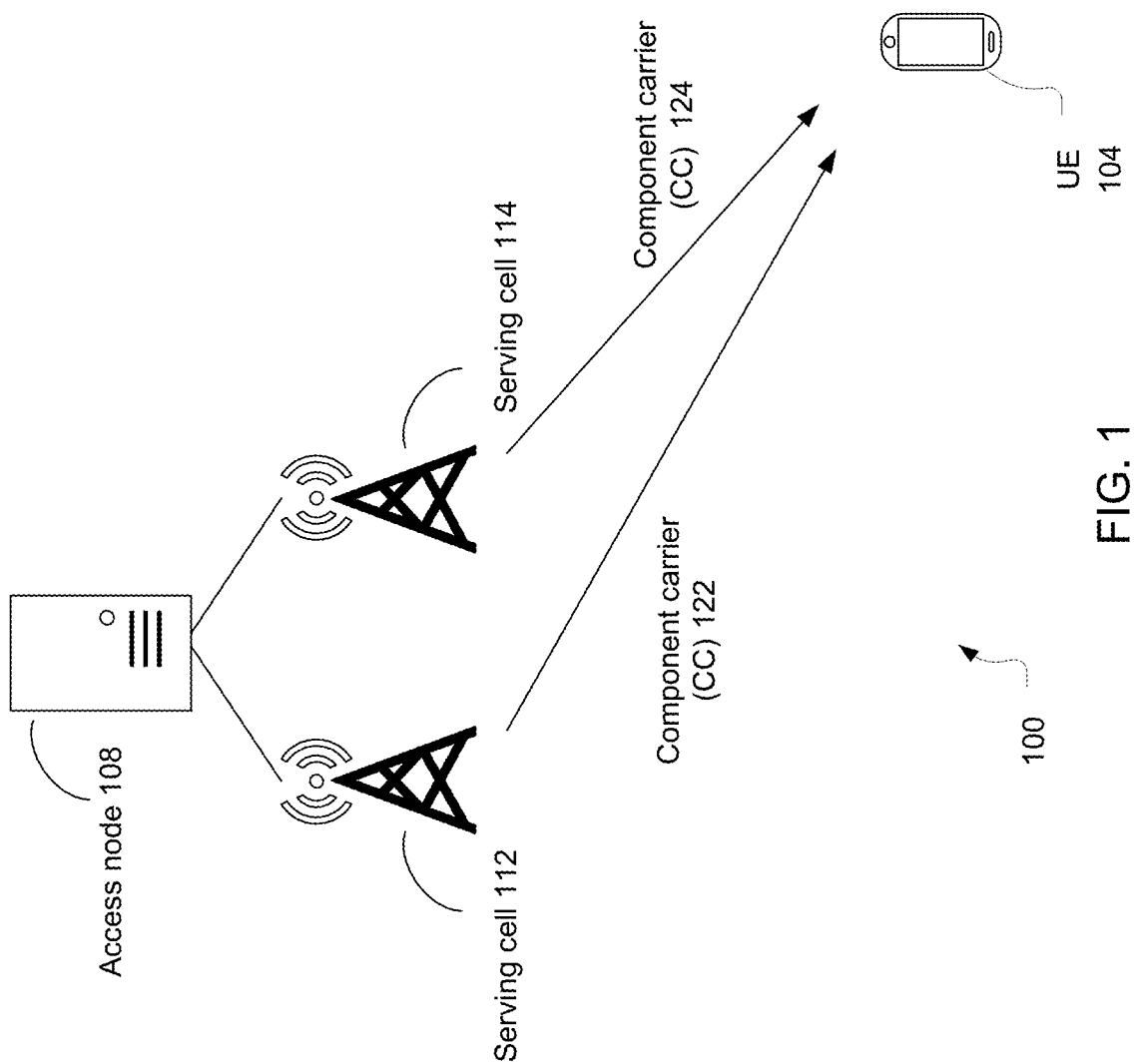
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for handling special cases of secondary serving cell (SCell) activation are described herein, especially with respect to activation of an SCell that does not transmit a Synchronization Signal (SS)/Physical Broadcast Channel (PBCH) block. FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio "NR" cells, through which the UE 104 may communicate with the access node 108 (e.g., over an NR-Uu interface).

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving physical downlink control channel (PDCCH) and physical downlink shared channel (PDSCH) transmissions. The UE may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

The CC 122 may be in a band in Frequency Range 1 (FR1) or in Frequency Range 2 (FR2). Likewise the CC 124 may be in a band in Frequency Range 1 (FR1) or in Frequency Range 2 (FR2). The CCs 112 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Figure 2:
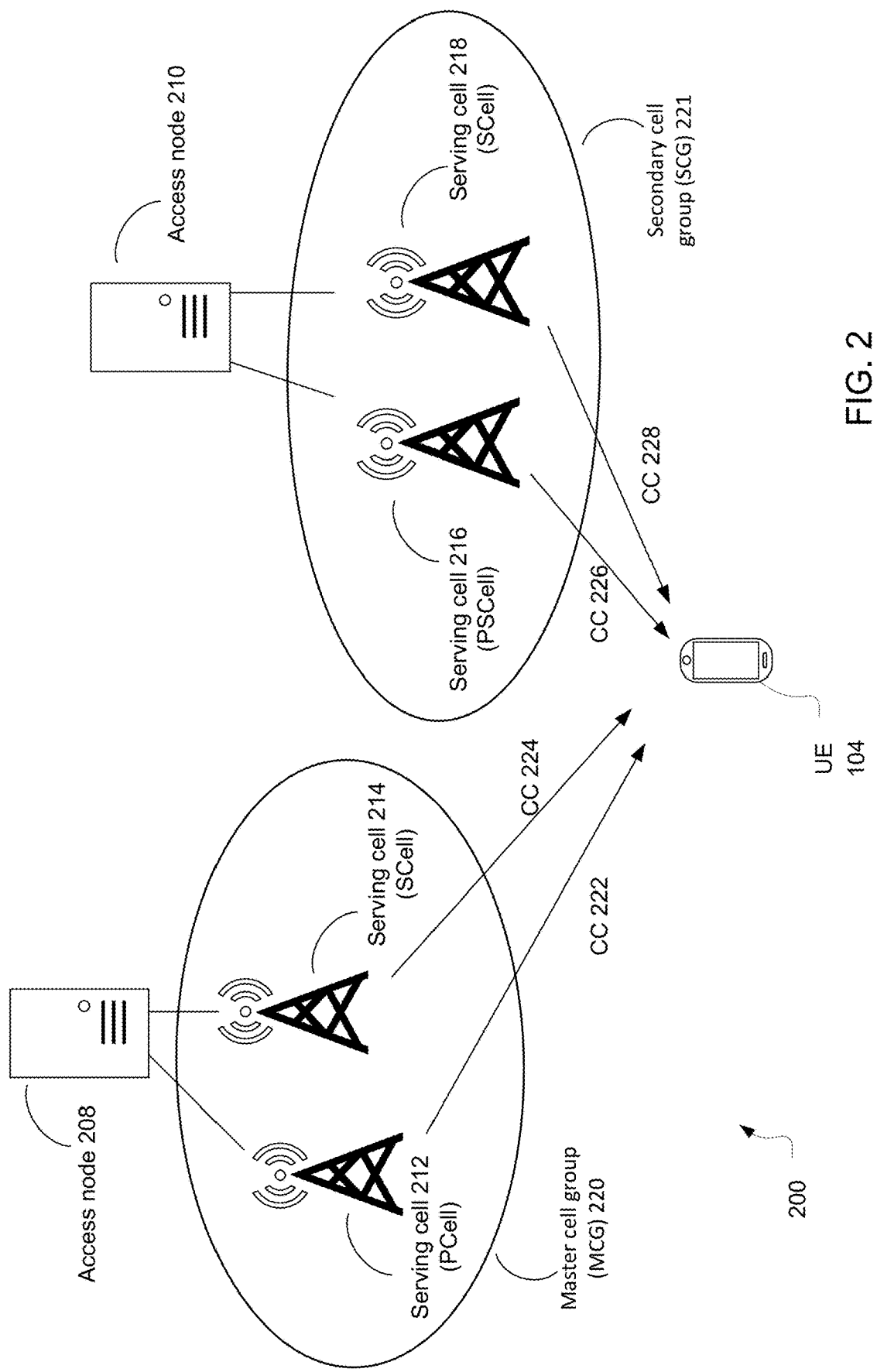
FIG. 2 illustrates a network environment in accordance with some embodiments.

FIG. 2 illustrates a network environment 200 in accordance with some embodiments. The network environment 100 may include the UE 104 and two or more access nodes (or "base stations") 208 and 210. Each of the access nodes 208 and 210 may provide one or more wireless serving cells, for example, 3GPP New Radio "NR" cells, through which the UE 104 may communicate with the access nodes 208 and 210. In this example, access node 208 provides two serving cells 212 and 214 that communicate with the UE 104 over CCs 222 and 224, respectively, and access node 210 provides two serving cells 216 and 218 that communicate with the UE 104 over CCs 226 and 228, respectively.

The UE 104 may communicate with the access nodes 208 and 210 over an air interface compatible with 3GPP technical specifications such as those that define Fifth Generation (5G) NR system standards. Each of the access nodes 208 and 210 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

FIG. 2 illustrates an example of dual connectivity (DC), in which the UE 104 may simultaneously transmit and receive data on multiple component carriers (CCs) from two different cell groups. In this example, access node 208 is the master node that provides the control plane connection to the core network, and access node 210 is the secondary node. The master node may be coupled with a 5G core (5GC) network via a backhaul connection that may support an NG-C interface. The serving cells provided by the master node (access node 208 in this example) comprise a master cell group (MCG) 220, and the serving cells provided by the secondary node (access node 210 in this example) comprise a secondary cell group (SCG) 221. Each of the MCG 220 and SCG 221 has a primary serving cell and, optionally, one or more secondary serving cells. A primary serving cell (also called special cell or spCell) of the MCG 220 may be referred to as PCell, and a secondary serving cell of the MCG 221 may be referred to as an SCell. A primary serving cell (spCell) of the SCG 220 may be referred to as PSCell, and a secondary serving cell of the SCG 221 may be referred to as an SCell or SSCell. In FIG. 2, serving cell 212 is the PCell, serving cell 216 is the PSCell, and serving cells 214 and 218 are SCells. The term "primary serving cell" may refer to either one of PCell and PSCell unless otherwise indicated, the term "secondary serving cell" may refer to either one of a secondary serving cell of the MCG and a secondary serving cell of the SCG unless otherwise indicated, and the term "SCell" may also refer to either one of a secondary serving cell of the MCG and a secondary serving cell of the SCG unless otherwise indicated.

Figure 3:
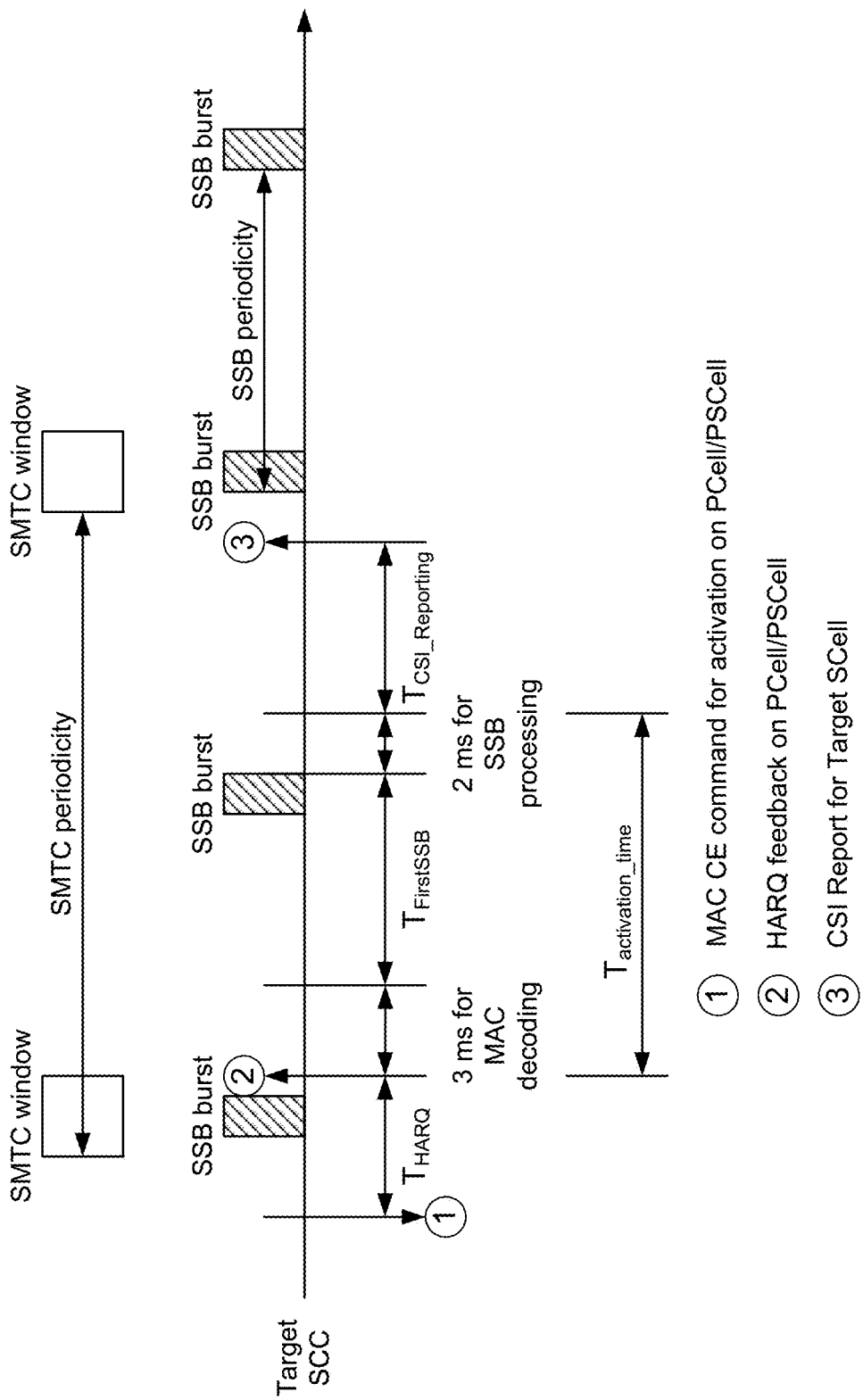
FIG. 3 shows an example of a timeline for secondary serving cell (SCell) activation in accordance with some embodiments.

FIG. 3 shows an example of a timeline for activation of a deactivated (e.g., not yet activated) SCell. At time point 1 in FIG. 3, the UE receives, on the PCell or PSCell, a Medium Access Control (MAC) Control Element (CE) that includes a command for activation of the SCell (also called the "target SCell") being activated on a target secondary component carrier (SCC). Upon receiving this SCell activation command in slot n, the UE is required to be capable of transmitting a valid Channel State Information (CSI) report and applying actions related to the activation command for the SCell being activated no later than in slot $$n + \frac{T_{HARQ} + T_{activation\_time} + T_{CSI\_Reporting}}{NR \text{ slot length}}.$$

At time point 2 in FIG. 3, the UE transmits Hybrid Automatic Repeat Request (HARQ) feedback to the PCell or PSCell after the period $T_{HARQ}$. At time point 3 in FIG. 3, the UE transmits a valid Channel State Information (CSI) report for the target SCell after the period $T_{CSI\_Reporting}$. The period from time point 1 to time point 3 (in NR slots) indicates an activation window within which the network expects to receive, on an uplink channel, a channel state information (CSI) report from the UE based on the activation command. If no CSI report is received by the time this window expires, the network may assume that the SCell activation has failed. The network may also expect that if the activation is successful, the UE will be able to transmit and receive on the SCell after time point 3.

In the example of FIG. 3, the period $T_{activation\_time}$ includes a three-millisecond period MAC decoding, a two-millisecond period for SSB processing, and a period $T_{FirstSSB}$ which is defined as follows in, e.g., section 8.3.2 of the 3rd Generation Partnership Project (3GPP) Technical Specification (TS) 38.133 (3GPP TS 38.133 V16.6.0 (2020-12)) entitled "3rd Generation Partnership Project; Technical Specification Group Radio Access Network; NR; Requirements for support of radio resource management (Release 16)" (3GPP, Valbonne, FR) ("TS 38.133"): "$T_{FirstSSB}$: is the time to the end of the first complete SSB burst indicated by an SSB Measurement Timing Configuration (SMTC) after slot $$n + \frac{T_{HARQ} + 3ms}{NR \text{ slot length}}."$$

FIG. 3 also shows a window duration and window periodicity as configured by the network in an SMTC, such as the Radio Resource Control (RRC) Information Element SSB-MTC as defined in section 6.3.2 of 3GPP TS 38.331 V16.3.1 (2021-01), entitled "5G; NR; Radio Resource Control (RRC); Protocol specification (3GPP TS 38.331 version 16.3.1 Release 16)" (3GPP, Valbonne, FR). The SMTC defines a set of periodic time windows during which the UE should complete its SSB measurements. As shown in FIG. 3, the SMTC may define an SMTC window duration that is longer than the actual SSB burst length and/or an SMTC window periodicity that is longer than the actual SSB periodicity at the serving cell. For example, the network may configure an SMTC periodicity of 80 milliseconds, but upon reading the system information from the target SCell, the UE may learn that the SCell's SSB periodicity is smaller (e.g., 40 milliseconds), and the UE may use this smaller value to locate the first SSB that it may receive after MAC decoding. The network configures the SMTC per component carrier (CC) configuration, so that the same SMTC is applied for all cells on that frequency layer, while the SSB periodicity is specific to each serving cell (e.g., to a specific serving cell on that component carrier).

Figure 4:
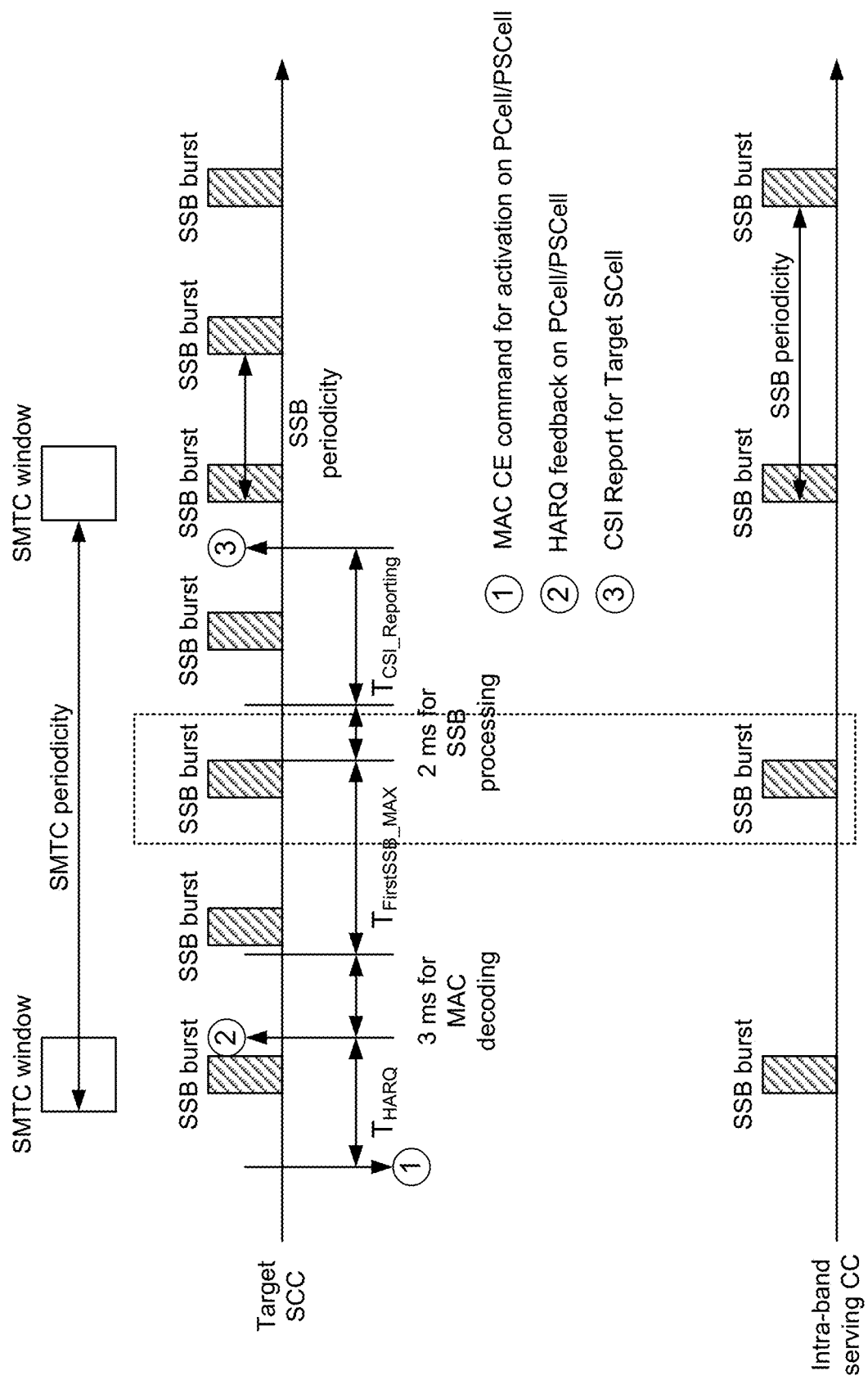
FIG. 4 shows another example of a timeline for SCell activation in accordance with some embodiments.

In some activation scenarios (e.g., as shown in FIG. 4), the period $T_{activation\_time}$ includes a period $T_{FirstSSB\_MAX}$ instead of a period $T_{FirstSSB}$. The period $T_{FirstSSB\_MAX}$ is defined in, e.g., section 8.3.2 of TS 38.133 as follows: "$T_{FirstSSB\_MAX}$: Is the time to the end of the first complete SSB burst indicated by the SMTC after slot $$n + \frac{T_{HARQ} + 3ms}{NR \text{ slot length}},"$$

that further fulfills, in FR1 and in case of intra-band SCell activation, "the occasion when all active serving cells and SCells being activated or released are transmitting SSB bursts in the same slot" (e.g., on the same symbols); in FR1 and in case of inter-band SCell activation, "the first occasion when the SCell being activated is transmitting SSB burst;" or, in FR2, "the occasion when all active serving cells and SCells being activated or released are transmitting SSB bursts in the same slot" (e.g., on the same symbols). A UE may be configured to perform automatic gain control (AGC) measurements during an occasion when all active serving cells and SCells being activated or released are transmitting SSB bursts in the same slot.

In some cases, a PCell or PSCell may command a UE to activate an SCell that does not transmit a Synchronization Signal (SS)/Physical Broadcast Channel (PBCH) block. A UE indicates its capability to support such activation by a parameter scellWithoutSSB, which is signalled per feature set (per band per band combination). If an SCell does not transmit SSBs, then a wider bandwidth may be needed to perform CSI measurement as compared to a case in which the SCell does transmit SSBs, for example, and a UE may not have the capability to perform such wider bandwidth measurement. The parameter scellWithoutSSB "[d]efines whether the UE supports configuration of SCell that does not transmit SS/PBCH block" (section 4.2.7.5 of 3GPP TS 38.306 V16.3.0 (2020-12) entitled "3rd Generation Partnership Project; Technical Specification Group Radio Access Network; NR; User Equipment (UE) radio access capabilities (Release 16)" (3GPP, Valbonne, FR) ("TS 38.306")). TS 38.306 states that the feature indicated by the parameter scellWithoutSSB is conditionally mandatory with capability signaling for intra-band CA.

Techniques for handling special cases of secondary serving cell (SCell) activation are described herein, especially with respect to activation of an SCell that does not transmit an SS/PBCH block ("SSB block"). Activation of an SCell in FR2 that does not transmit a SSB block may be defined as follows: If the SCell being activated (also called the "target SCell") belongs to FR2, and if there is at least one active serving cell on that FR2 band, then if the UE supports scellWithoutSSB but is not provided with any SMTC for the target SCell, $T_{activation\_time}$ is 3 ms, provided that the Reference Signal(s) (RS(s))of the SCell being activated have a quasi-co-location assumption of Type D ("is (are) QCL-TypeD") with RS(s) of one active serving cell on that FR2 band. A quasi-co-location assumption of Type D ("a QCL-TypeD relation") is a spatial receive (Rx) parameter that corresponds to receiver beam information at the UE. In this activation scenario, the UE may leverage existing estimation results on an intra-band active serving cell. For example, the UE may utilize timing tracking information (e.g., estimated timing shift and/or offset), frequency tracking information (e.g., estimated frequency shift and/or offset), and/or automatic gain control (AGC) information (e.g., for RF amplifier) from the intra-band active serving cell.

One approach to activation of an SCell in FR1 that does not transmit a SSB block may be described as follows: If the SCell being activated belongs to FR1, and if there is at least one active serving cell contiguous to the SCell on that FR1 band, then if the UE supports scellWithoutSSB and is not provided with any SMTC for the target SCell, $T_{activation\_time}$ is 3 ms, provided that the RS(s) of SCell being activated have a quasi-co-location assumption of Type A ("is (are) QCL-TypeA") with Tracking Reference Signal(s) (TRS(s)) of the SCell being activated, and the TRS(s) have a quasi-co-location assumption of Type C ("is (are) QCL-TypeC") with SSB(s) of one active serving cell contiguous to the SCell being activated on that FR1 band, and the target SCell's receive timing difference (RTD) with the contiguous active serving cell (e.g., as measured at the UE) is smaller than or equal to 260 ns, and the target SCell's reception power difference with the contiguous active serving cell (e.g., as measured at the UE) is smaller than or equal to 6 dB. A quasi-co-location assumption of Type A ("a QCL-TypeA relation") indicates that Doppler shift, Doppler spread, average delay, and delay spread are assumed to be common across the signals. A quasi-co-location assumption of Type C ("a QCL-TypeC relation") indicates that average delay and delay spread are assumed to be common across the signals. In this activation scenario (similarly to the analogous FR2 case described immediately above), the UE utilizes timing tracking information, frequency tracking information, and/or AGC information from the contiguous intra-band active serving cell.

The three-millisecond period in these activation timeline designs is the time for MAC CE decoding, and a $T_{activation\_time}$ period of 3 ms indicates that the UE will directly utilize the timing tracking information, frequency tracking information, and/or AGC information from an intra-band active serving cell to the target SCell.

Besides the UE capability to support configuration of SCell that does not transmit an SSB, there are some network configurations that may be taken into account. One such network configuration is the parameter absoluteFrequencySSB, which indicates the carrier frequency of the SSB to be used for this serving cell. Like the SSB periodicity, the parameter absoluteFrequencySSB is specific to each serving cell (e.g., is specific to a particular serving cell on a component carrier, unlike the SMTC). Absence of the parameter absoluteFrequencySSB in a configuration for the SCell represents that SSBs are not available for the SCell.

Another network configuration that may be considered is the parameter SS/PBCH Block Measurement Timing Configuration (SMTC), which defines a set of periodic time windows during which the UE should complete its measurements. As shown in FIGS. 3 and 4, the SMTC may define an SMTC window length and an SMTC window periodicity. TS 38.133 provides that if the network has not configured an SMTC to the UE, the UE may directly utilize timing tracking information, frequency tracking information, and/or AGC information from an intra-band active serving cell (e.g., an active serving cell that is on a different component carrier in the same frequency band). Such an approach may be inappropriate, however, because absence of SMTC in a configuration for the target SCell does not necessarily mean that the target SCell does not transmit SS/PBCH blocks. Likewise, because the network configures SMTC per CC but configured SSB per serving cell, the network may configure an SMTC for a target SCell that does not transmit SSBs.

In section 8.3.2, TS 38.133 provides for a default SMTC periodicity (or SSB transmission periodicity) as follows (emphasis added): "$T_{rs}$ is the SMTC periodicity of the SCell being activated if the UE has been provided with an SMTC configuration for the SCell in SCell addition message, otherwise Trs is the SMTC configured in the measObjectNR having the same SSB frequency and subcarrier spacing. If the UE is not provided SMTC configuration or measurement object on this frequency, the requirement which involves $T_{rs}$ is applied with $T_{rs}$=5 ms assuming the SSB transmission periodicity is 5 ms." Although TS 38.133 thus provides for a default SMTC periodicity of five milliseconds, however, it may be inappropriate to use the default SMTC periodicity when the network configuration for the target SCell does not include the parameter absoluteFrequencySSB.

Figure 6:
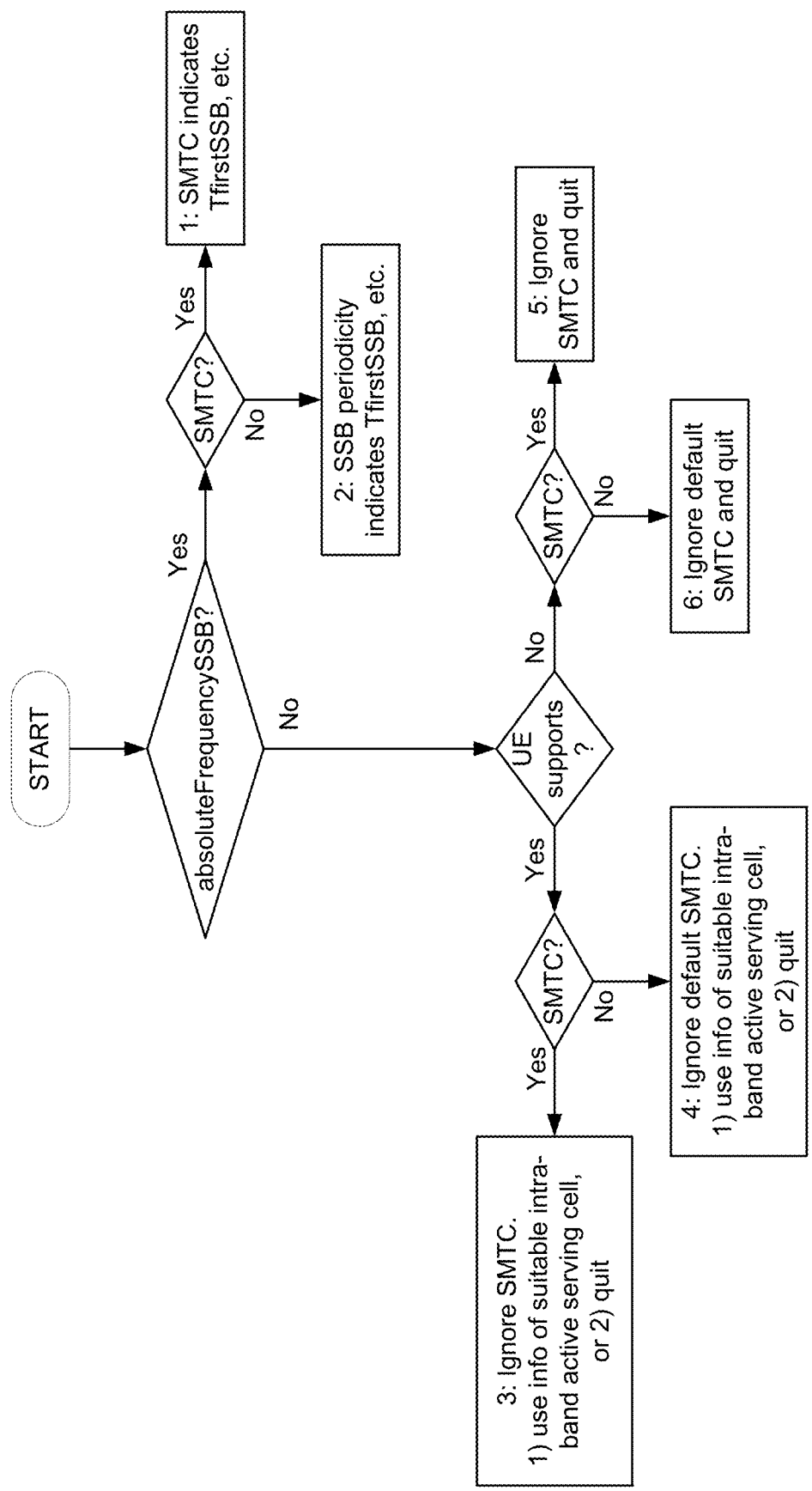
FIG. 6 shows a diagram of a decision tree that summarizes various configuration combinations for SCell activation in accordance with some embodiments.

FIG. 5 shows a table that summarizes various configuration combinations for SCell activation in terms of whether the network has configured the parameter absoluteFrequencySSB for the target SCell, whether the network has configured an SMTC for the target SCell, and whether the UE has scellWithoutSSB capability. FIG. 6 shows a diagram of a decision tree that summarizes these configuration combinations for SCell activation in a different form. SCell activation for Case 1 is described in section 8.3.2 of TS 38.133 as discussed above. In order to obtain a desired UE behavior based on other configurations, descriptions and solutions relating to SCell activation for Cases 2-6 are described in more detail herein.

In Case 2, the network has configured the parameter absoluteFrequencySSB for the target SCell (e.g., in the Information Element (IE) "DownlinkConfigCommon" as described in TS 38.331), but the network has not configured SMTC for the target SCell. For this case, the definitions of the components $T_{FirstSSB}$ and $T_{FirstSSB\_MAX}$ of the SCell activation timeline in, e.g., section 8.3.2 of TS 38.133 as described above may be revised as follows (in which the underlining indicates parts that are added):

"$T_{FirstSSB}$: is the time to the end of the first complete SSB burst indicated by the SMTC, or the first complete SSB burst within SSB periodicity indicated by ssb-periodicityServingCell, or the first complete SSB burst within by-default SMTC periodicity (5 ms), after slot $$n + \frac{T_{HARQ} + 3ms}{NR \text{ slot length}}.$$

If the by-default SMTC periodicity (5 ms) is utilized by UE here, but the actual SSB periodicity is not 5 ms, UE may extend the SCell activation processing or drop the SCell activation procedure; and therefore, in this case the to-be-activated SCell activation period is 'no requirement' or 'not feasible.'"

"$T_{FirstSSB\_MAX}$: Is the time to the end of the first complete SSB burst indicated by the SMTC, or the first complete SSB burst within SSB periodicity indicated by ssb-periodicity-ServingCell, or the first complete SSB burst within by-default SMTC periodicity (5 ms), after slot $$n + \frac{T_{HARQ} + 3ms}{NR \text{ slot length}},$$

further fulfilling: —in FR1, in case of intra-band SCell activation, the occasion when all active serving cells and SCells being activated or released are transmitting SSB bursts in the same slot; in case of inter-band SCell activation, the first occasion when the SCell being activated is transmitting SSB burst. —In FR2, the occasion when all active serving cells and SCells being activated or released are transmitting SSB bursts in the same slot. If the by-default SMTC periodicity (5 ms) is utilized by UE here, but the actual SSB periodicity is not 5 ms, UE may extend the SCell activation processing or drop the SCell activation procedure; and therefore, in this case the to-be-activated SCell activation period is 'no requirement' or 'not feasible.'"

The parameter ssb-periodicityServingCell is found, e.g., in the Information Element "ServingCellConfigCommonSIB".

In Case 3, the network has configured SMTC for the target SCell but has not configured the parameter absoluteFrequencySSB for the target SCell. Also in this case, the UE indicates support for SSB-less SCell (scellWithoutSSB), and there is at least one active serving cell on the same band as the target SCell. The UE may be configured to handle this case as an error case (so that no requirement shall apply), or the UE may ignore the SMTC. For example, the UE may be configured to ignore the SMTC which the network has configured, and either (1) utilize timing tracking information, frequency tracking information, and/or AGC information from a suitable intra-band active serving cell if available or (2) quit the SCell activation procedure (e.g., the UE will not send a CSI report for the SCell or do downlink synchronization for the SCell).

Suitability of an intra-band active serving cell may be determined as follows. If the target SCell belongs to FR1, and the RS(s) of the target SCell is (are) QCL-TypeA with TRS(s) of the target SCell, a suitable intra-band active serving cell may be an active serving cell contiguous to the target SCell on that FR1 band which satisfies the following conditions: the TRS(s) of the target SCell is (are) QCL-TypeC with SSB(s) of the active serving cell contiguous to the target SCell on that FR1 band; the target SCell's RTD with the contiguous active serving cell is smaller than or equal to 260 ns; and the target SCell's reception power difference with the contiguous active serving cell is smaller than or equal to 6 dB. If the target SCell belongs to FR2, a suitable intra-band active serving cell may be an intra-band active serving cell whose transmit (Tx) beam is the same as the Tx beam of the target SCell. If the UE quits the activation procedure for the target SCell (e.g., because no suitable active serving cell is found), the activation period for the target SCell ("target SCell activation period") may be indicated as "no requirement" or "not feasible."

In some embodiments, a desired network behavior for handling Case 3 may be as follows: the network shall configure SMTC for a target SCell only if absoluteFrequencySSB is configured for that target SCell.

In Case 4, the network has not configured absoluteFrequencySSB for the target SCell, and the network has not configured SMTC for the target SCell. Also in this case, the UE supports SSB-less SCell (scellWithoutSSB), and there is at least one active serving cell on the same band as the target to-be-activated SCell.

It may be desired for the UE to handle Case 4 by ignoring the default SMTC (e.g., the default SMTC as discussed above) and either (1) utilizing timing tracking information, frequency tracking information, and/or AGC information from a suitable intra-band active serving cell if available or (2) quitting the SCell activation procedure. Thus, the target SCell activation period for Case 4 may be 3 ms if a suitable intra-band active serving cell is available. Suitability of an intra-band active serving cell for FR1 and FR2 may be determined as described above with reference to Case 3.

In some embodiments, a desired network behavior for handling Case 4 may be as follows: the network shall not configure SMTC for a target to-be-activated SCell as long as absoluteFrequencySSB is not configured for that target SCell.

In Case 5, the network has configured an SMTC for the target SCell, but the network has not configured absoluteFrequencySSB for the target SCell. In this case, the UE does not support SSB-less SCell (scellWithoutSSB), and there may or may not be at least one active serving cell on the same band as the target to-be-activated SCell. It may be desired to configure the UE to handle this case by ignoring the SMTC and quitting the SCell activation procedure (e.g., the UE will not send a CSI report for the SCell or do downlink synchronization for the SCell). As this case is beyond the UE's capability, the target SCell activation period is "no requirement" or "not feasible" (e.g., no requirement shall apply). A desired network behavior for handling Case 5 may be that the network shall not configure SCell activation without absoluteFrequencySSB if the UE does not support SSB-less SCell (scellWithoutSSB), regardless of whether the network configures a SMTC for the target SCell or not.

Figure 7:
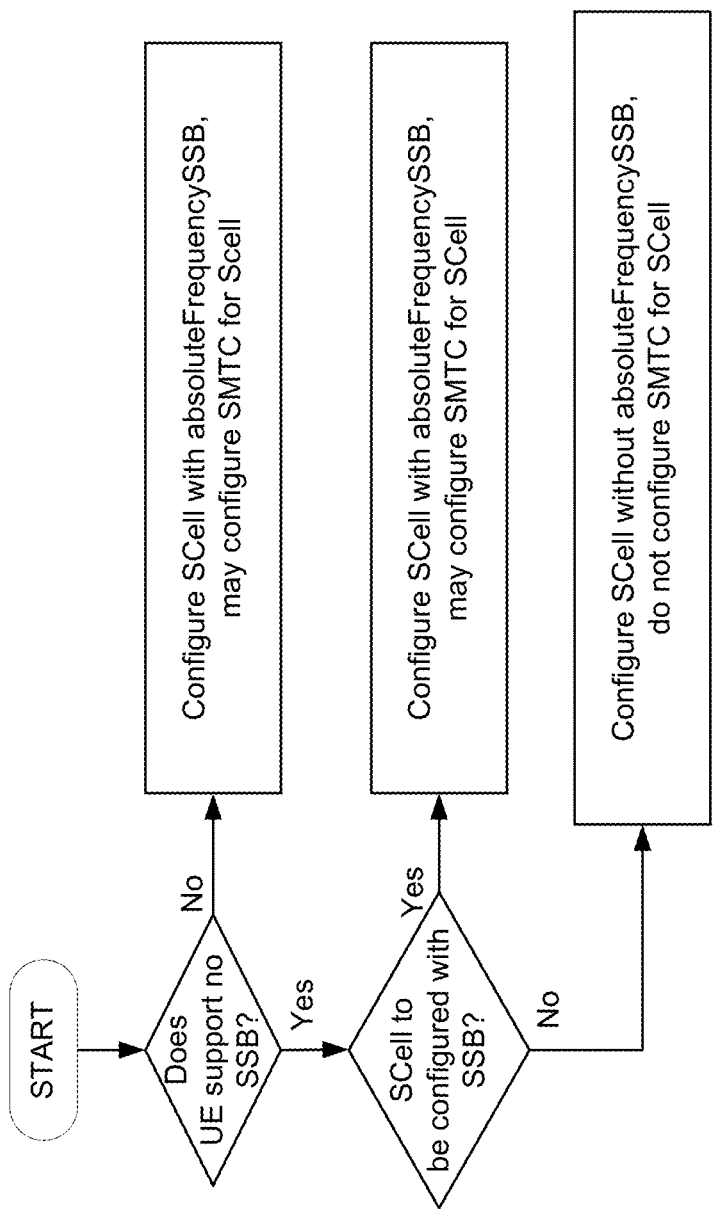
FIG. 7 shows a diagram of a decision tree that summarizes various configuration combinations for network configuration in accordance with some embodiments.

In Case 6, the network has not configured absoluteFrequencySSB for the target SCell, and the network also has not configured a SMTC for the target SCell. In this case, the UE does not support SSB-less SCell (scellWithoutSSB), and there may or may not be at least one active serving cell on the same band as the target to-be-activated SCell. It may be desired to configure the UE to handle this case by ignoring the default SMTC (e.g., the default SMTC as discussed above) and quitting the SCell activation procedure. As this case is beyond the UE's capability, the target SCell activation period is "no requirement" or "not feasible" (e.g., no requirement shall apply). A desired network behavior for handling Case 6 may be that the network shall not configure SCell activation without absoluteFrequencySSB if the UE does not support SSB-less SCell (scellWithoutSSB), regardless of whether the network configures a SMTC for the target SCell or not. FIG. 7 shows a diagram of a decision tree that summarizes various configuration combinations for network configuration for a target SCell as described herein.

Figure 8:
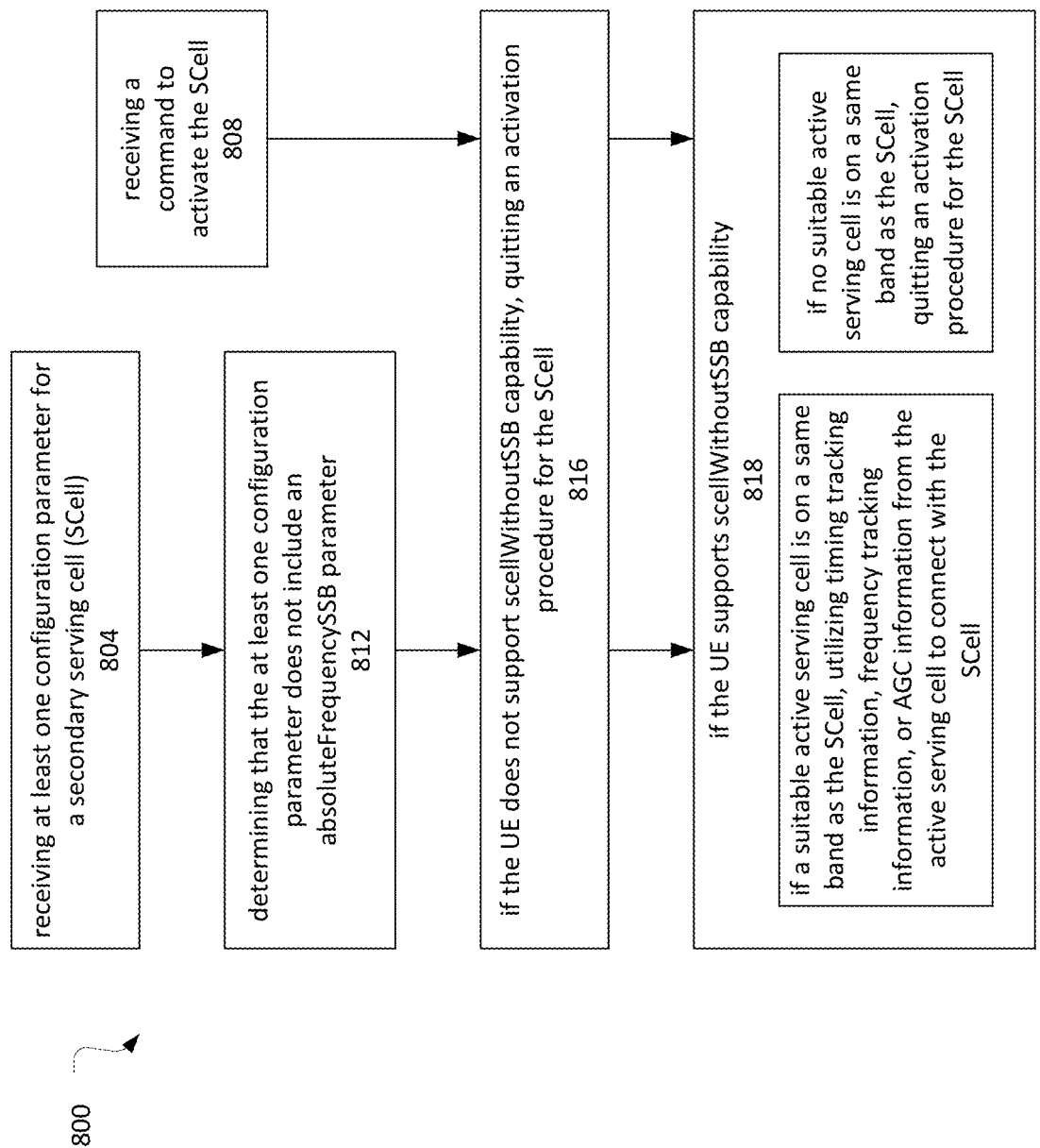
FIG. 8 illustrates an operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1500; or components thereof, for example, baseband processor 1504A.

The operation flow/algorithmic structure 800 may include, at 804, receiving at least one configuration parameter for a secondary serving cell (SCell).

The operation flow/algorithmic structure 800 may further include, at 808, receiving a command to activate the SCell.

The operation flow/algorithmic structure 800 may further include, at 812, determining that the at least one configuration parameter does not include an absoluteFrequencySSB parameter.

The operation flow/algorithmic structure 800 may further include, at 816, if the UE does not support scellWithoutSSB capability, quitting an activation procedure for the SCell.

The operation flow/algorithmic structure 800 may further include, at 818, if the UE does support scellWithoutSSB capability: if a suitable active serving cell is on a same band as the SCell, utilizing timing tracking information, frequency tracking information, or automatic gain control (AGC) information from the active serving cell to connect with the SCell; and if no suitable active serving cell is on a same band as the SCell, quitting an activation procedure for the SCell.

The same band may be in FR1 or in FR2. If the same band is in FR2, the operation flow/algorithmic structure 800 may further include determining whether an active serving cell on the same band as the SCell is a suitable active serving cell based on whether at least one reference signal (RS) of the SCell has a QCL-TypeD relation with at least one RS of the active serving cell. If the same band is in FR1, the operation flow/algorithmic structure 800 may further include determining whether an active serving cell on the same band as the SCell is a suitable active serving cell based on whether the active serving cell is contiguous to the SCell, whether at least one reference signal (RS) of the SCell has a QCL-TypeA relation with at least one tracking reference signal (TRS) of the SCell, whether the at least one TRS of the SCell has a QCL-TypeC relation with at least one Synchronization Signal Block (SSB) of the active serving cell, whether the receive timing difference between the SCell and the active serving cell is less than or equal to 260 ns, and/or whether the reception power difference between the SCell and the active serving cell is smaller than or equal to 6 dB.

The at least one configuration parameter may include an SMTC, and the operation flow/algorithmic structure 800 may further include ignoring the SMTC. Alternatively, the at least one configuration parameter may include no SMTC, and the operation flow/algorithmic structure 800 may further include ignoring a default SMTC.

Figure 9:
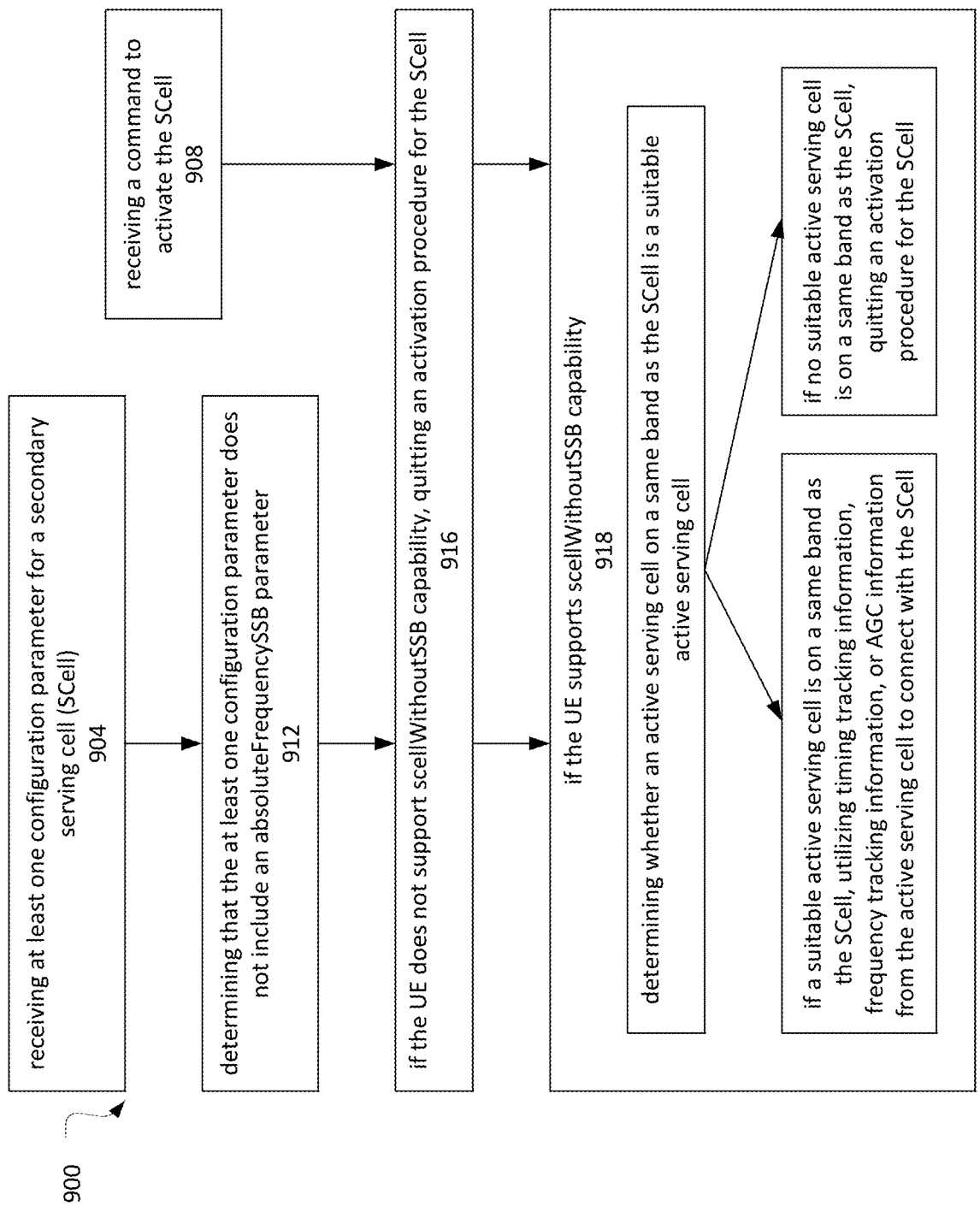
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a UE such as, for example, UE 104 or UE 1500; or components thereof, for example, baseband processor 1504A.

The operation flow/algorithmic structure 900 may include, at 904, receiving at least one configuration parameter for a secondary serving cell (SCell).

The operation flow/algorithmic structure 900 may further include, at 908, receiving a command to activate the SCell.

The operation flow/algorithmic structure 900 may further include, at 912, determining that the at least one configuration parameter does not include an absoluteFrequencySSB parameter.

The operation flow/algorithmic structure 900 may further include, at 916, if the UE does not support scellWithoutSSB capability, quitting an activation procedure for the SCell.

The operation flow/algorithmic structure 900 may further include, at 918, if the UE does support scellWithoutSSB capability, determining whether an active serving cell on a same band as the SCell is a suitable active serving cell, and: if a suitable active serving cell is on a same band as the SCell, utilizing timing tracking information, frequency tracking information, or automatic gain control (AGC) information from the active serving cell to connect with the SCell; or, if no suitable active serving cell is on a same band as the SCell, quitting an activation procedure for the SCell.

The same band may be in FR1 or in FR2. If the same band is in FR2, the operation flow/algorithmic structure 900 may further include determining whether an active serving cell on the same band as the SCell is a suitable active serving cell based on whether at least one reference signal (RS) of the SCell has a QCL-TypeD relation with at least one RS of the active serving cell. If the same band is in FR2, the operation flow/algorithmic structure 800 may further include determining whether an active serving cell on the same band as the SCell is a suitable active serving cell based on whether the active serving cell is contiguous to the SCell, whether at least one reference signal (RS) of the SCell has a QCL-TypeA relation with at least one tracking reference signal (TRS) of the SCell, and/or whether the at least one TRS of the SCell has a QCL-TypeC relation with at least one Synchronization Signal Block (SSB) of the active serving cell.

The at least one configuration parameter may include an SMTC, and the operation flow/algorithmic structure 900 may further include ignoring the SMTC. Alternatively, the at least one configuration parameter may include no SMTC, and the operation flow/algorithmic structure 900 may further include ignoring a default SMTC.

Figure 10:
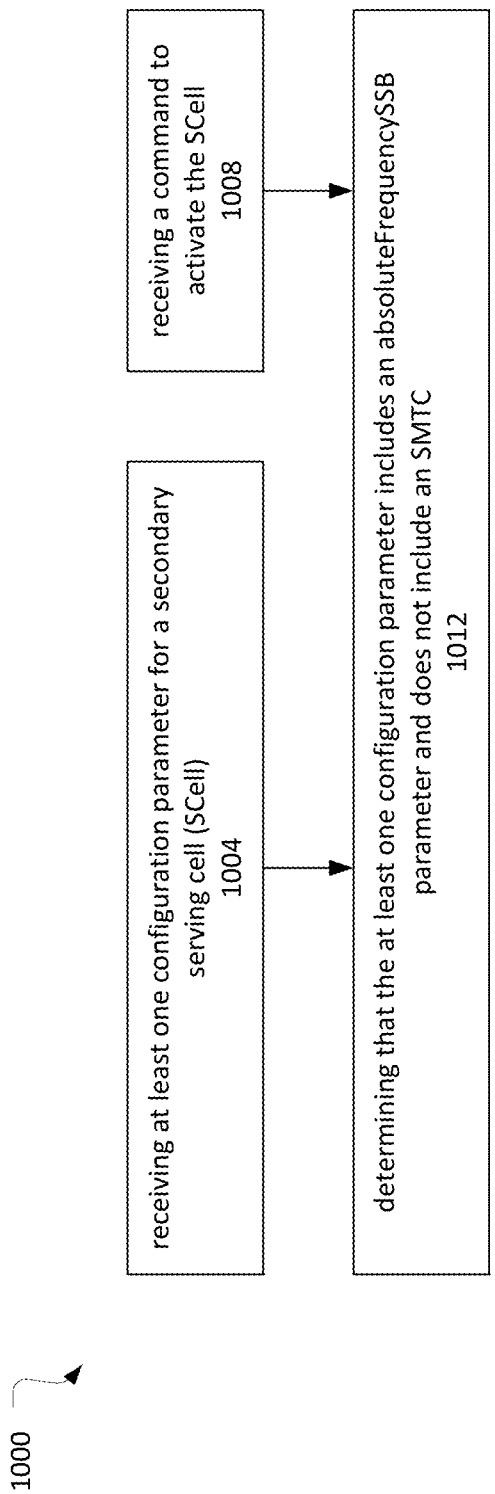
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a UE such as, for example, UE 104 or UE 1500; or components thereof, for example, baseband processor 1504A.

The operation flow/algorithmic structure 1000 may include, at 1004, receiving at least one configuration parameter for a secondary serving cell (SCell).

The operation flow/algorithmic structure 1000 may further include, at 1008, receiving a command to activate the SCell.

The operation flow/algorithmic structure 1000 may further include, at 1012, determining that the at least one configuration parameter includes an absoluteFrequencySSB parameter and does not include an SMTC. In response to the determining, an activation time for the SCell may be based on a time to an end of a first complete SSB burst within an SSB periodicity indicated by an ssb-periodicityServingCell parameter received by the UE.

The operation flow/algorithmic structure 1000 may further include sending a channel state report for the SCell within a period that is based on the activation time. Alternatively or additionally, the operation flow/algorithmic structure 1000 may further include decoding, within a period for medium access control (MAC) decoding, a MAC control element (CE) that includes the command to activate the SCell, wherein the activation time includes the period for MAC decoding. The activation time may be further based on an occasion when the SCell and all active serving cells on the same band as the SCell are transmitting SSB bursts on the same symbols.

Figure 11:
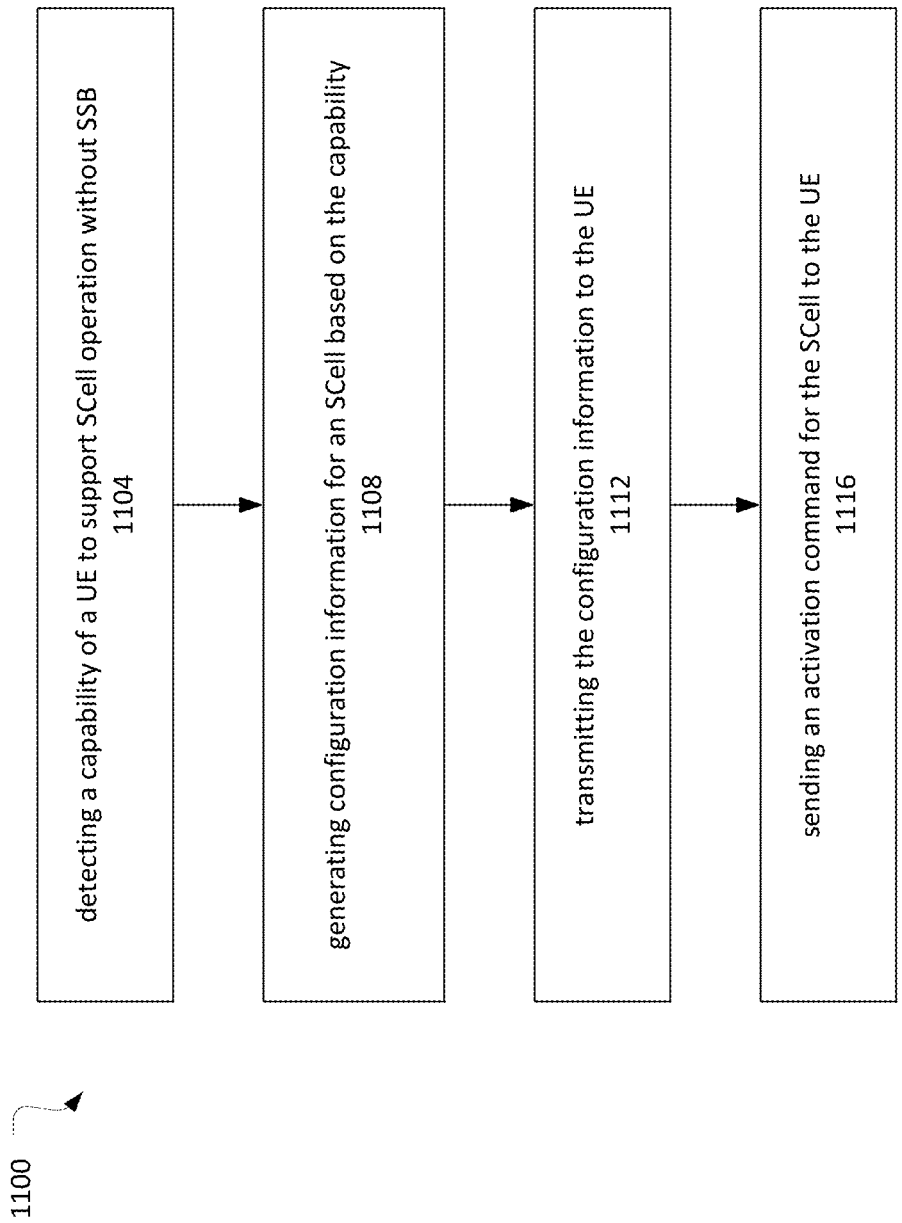
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by an access node such as, for example, access node 108, 208, 210, or 1600; or components thereof, for example, baseband processor 1604A.

The operation flow/algorithmic structure 1100 may include, at 1104, detecting a capability of a UE to support SCell operation without SSB.

The operation flow/algorithmic structure 1100 may further include, at 1108, generating configuration information for an SCell based on the capability.

The operation flow/algorithmic structure 1100 may further include, at 1112, transmitting the configuration information to the UE. The transmitting may include, based on a determination that the UE lacks capability to support scell-WithoutSSB, transmitting the configuration information to include an absoluteFrequencySSB parameter for the SCell. Alternatively, the transmitting may include, based on a determination that the UE has capability to support scell-WithoutSSB, transmitting the configuration information to include no absoluteFrequencySSB parameter for the SCell and/or transmitting the configuration information to include no Synchronization Signal (SS)/Physical Broadcast Channel (PBCH) Block Measurement Timing Configuration (SMTC) for the SCell. The configuration information may include an absoluteFrequencySSB parameter for the SCell and a Synchronization Signal (SS)/Physical Broadcast Channel (PBCH) Block Measurement Timing Configuration (SMTC) for the SCell. Alternatively, the configuration information may include an absoluteFrequencySSB parameter for the SCell and not include any Synchronization Signal (SS)/Physical Broadcast Channel (PBCH) Block Measurement Timing Configuration (SMTC) for the SCell.

The operation flow/algorithmic structure 1100 may further include, at 1116, sending an activation command for the SCell to the UE.

Figure 12:
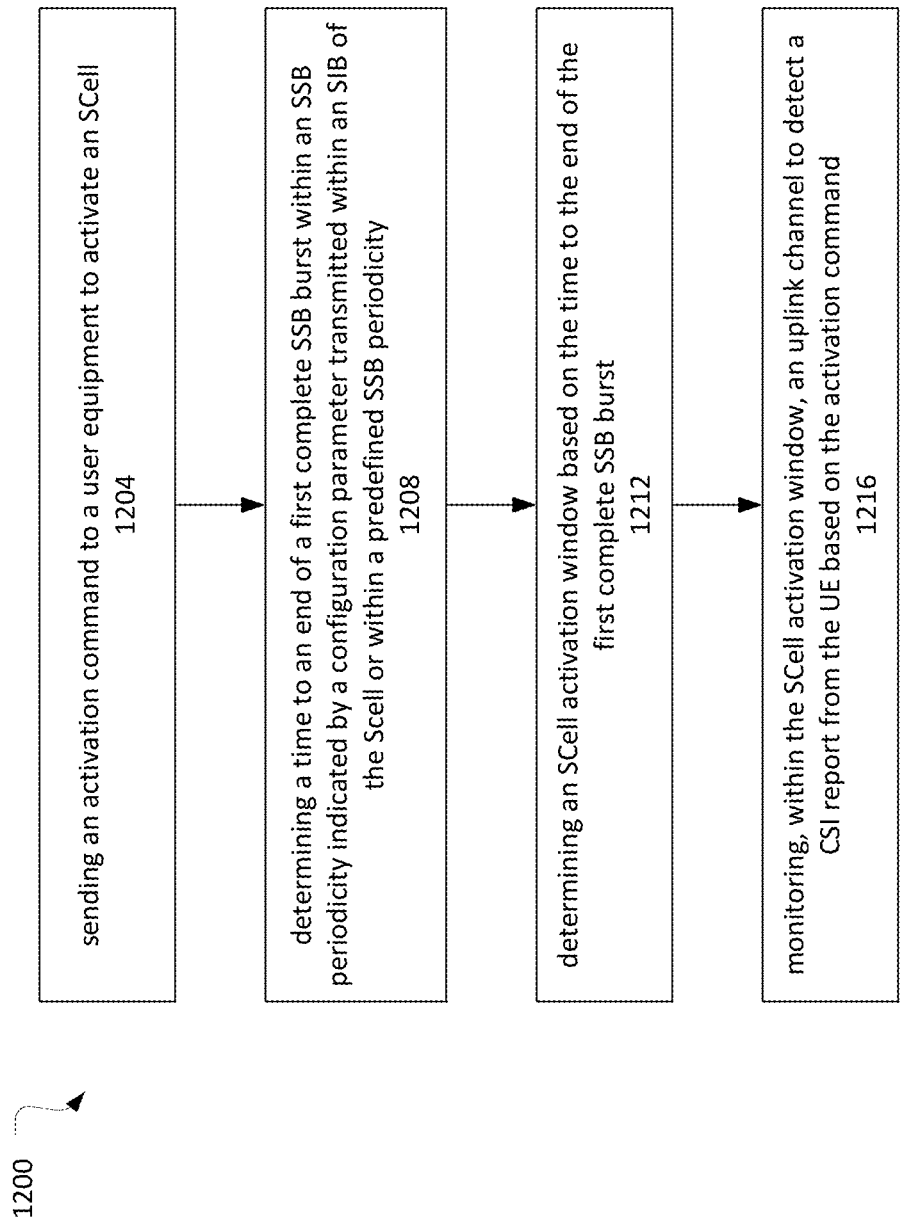
FIG. 12 illustrates an operational flow/algorithmic structure in accordance with some embodiments.

FIG. 12 illustrates an operation flow/algorithmic structure 1200 in accordance with some embodiments. The operation flow/algorithmic structure 1200 may be performed or implemented by an access node such as, for example, access node 108, 208, 210, or 1600; or components thereof, for example, baseband processor 1604A.

The operation flow/algorithmic structure 1200 may include, at 1204, sending an activation command to a user equipment to activate an SCell.

The operation flow/algorithmic structure 1200 may further include, at 1208, determining a time to an end of a first complete SSB burst within an SSB periodicity indicated by a configuration parameter transmitted within an SIB of the SCell.

The operation flow/algorithmic structure 1200 may further include, at 1212, determining an SCell activation window based on the time to the end of the first complete SSB burst.

The operation flow/algorithmic structure 1200 may further include, at 1216, monitoring, within the SCell activation window, an uplink channel to detect a CSI report from the UE based on the activation command. The operation flow/algorithmic structure 1200 may further include determining a second time to an end of a first complete SSB burst based on an occasion when the SCell and all active serving cells on the same band as the SCell are transmitting SSB bursts on the same symbols.

Figure 13:
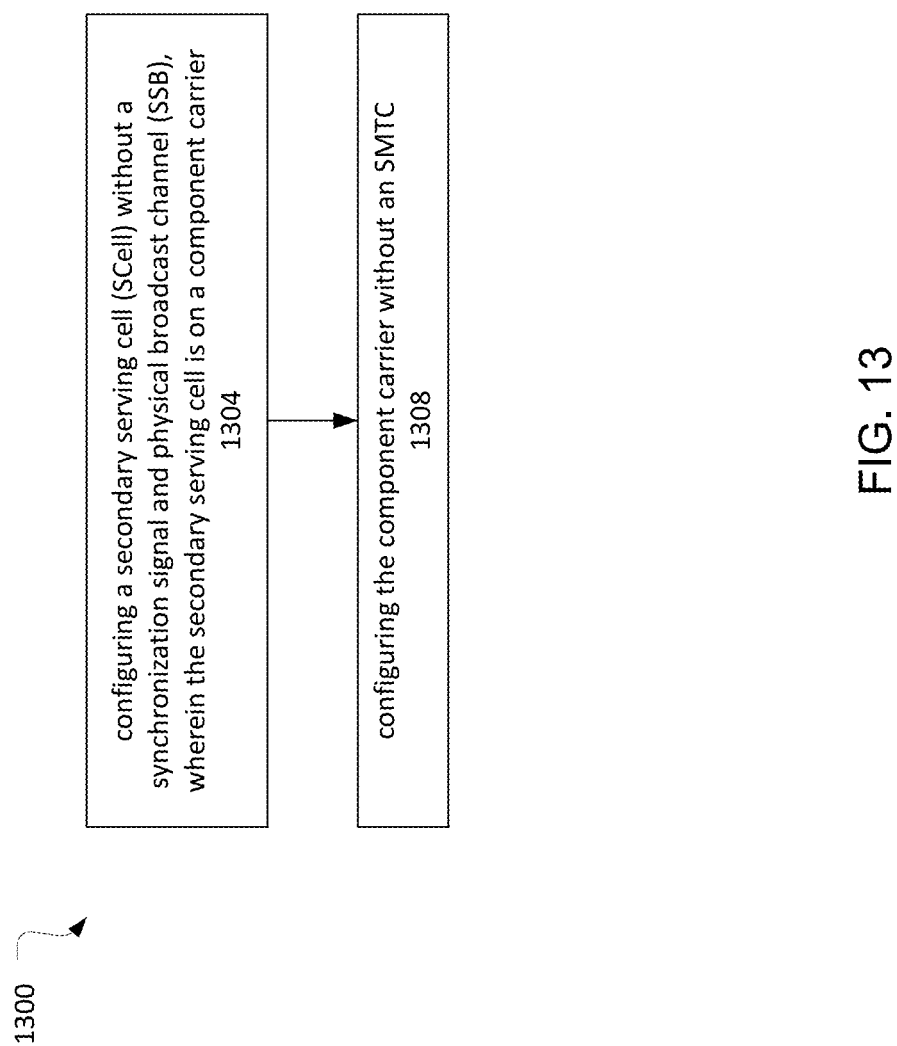
FIG. 13 illustrates an operational flow/algorithmic structure in accordance with some embodiments.

FIG. 13 illustrates an operation flow/algorithmic structure 1300 in accordance with some embodiments. The operation flow/algorithmic structure 1300 may be performed or implemented by an access node such as, for example, access node 108, 208, 210, or 1600; or components thereof, for example, baseband processor 1604A.

The operation flow/algorithmic structure 1300 may include, at 1304, configuring a secondary serving cell (SCell) without a synchronization signal and physical broadcast channel (SSB), wherein the secondary serving cell is on a component carrier.

The operation flow/algorithmic structure 1300 may further include, at 1308, configuring the component carrier without an SMTC. The SCell may be a first SCell, the component carrier may be a first component carrier, and the operation flow/algorithmic structure 1300 may further include configuring a second SCell on a second component carrier with an SSB; and configuring the second component carrier with an SMTC.

Figure 14:
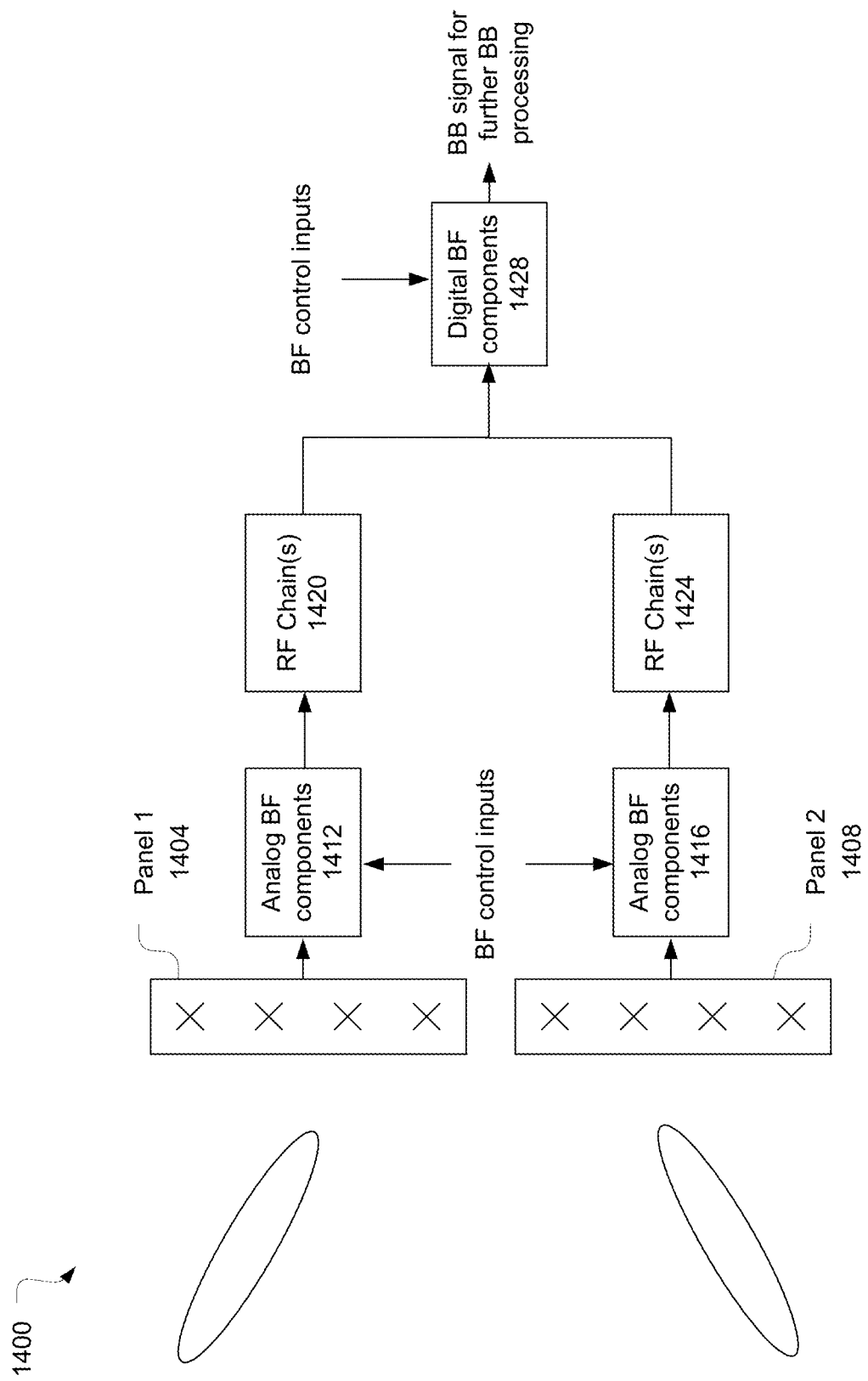
FIG. 14 illustrates beamforming components of a device in accordance with some embodiments.

FIG. 14 illustrates receive components 1400 of a device in accordance with some embodiments. The device may be the UE 104 or serving cell 112, 114, 212, 214, 216, or 218. The receive components 1400 may include a first antenna panel, panel 1 1404, and a second antenna panel, panel 2 1408. Each antenna panel may include a number of antenna elements.

The antenna panels may be coupled to respective analog beamforming (BF) components. For example, panel 1 1404 may be coupled with analog BF components 1412 and panel 2 1408 may be coupled with analog BF components 1416.

The analog BF components may be coupled with one or more radio-frequency (RF) chains. For example, analog BF components 1412 may be coupled with one or more RF chains 1420 and analog BF components 1416 may be coupled with one or more RF chains 1424. The RF chains may amplify a receive analog RF signal, downconvert the RF signal to baseband, and convert the analog baseband signal to a digital baseband signal, which may be provided to digital BF components 1428. The digital BF components 1428 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 1412 or complex weights provided to the digital BF components 1428. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 1400 describe receive beamforming, other embodiments may include beamforming components that perform transmit beamforming in analogous manners.

Figure 15:
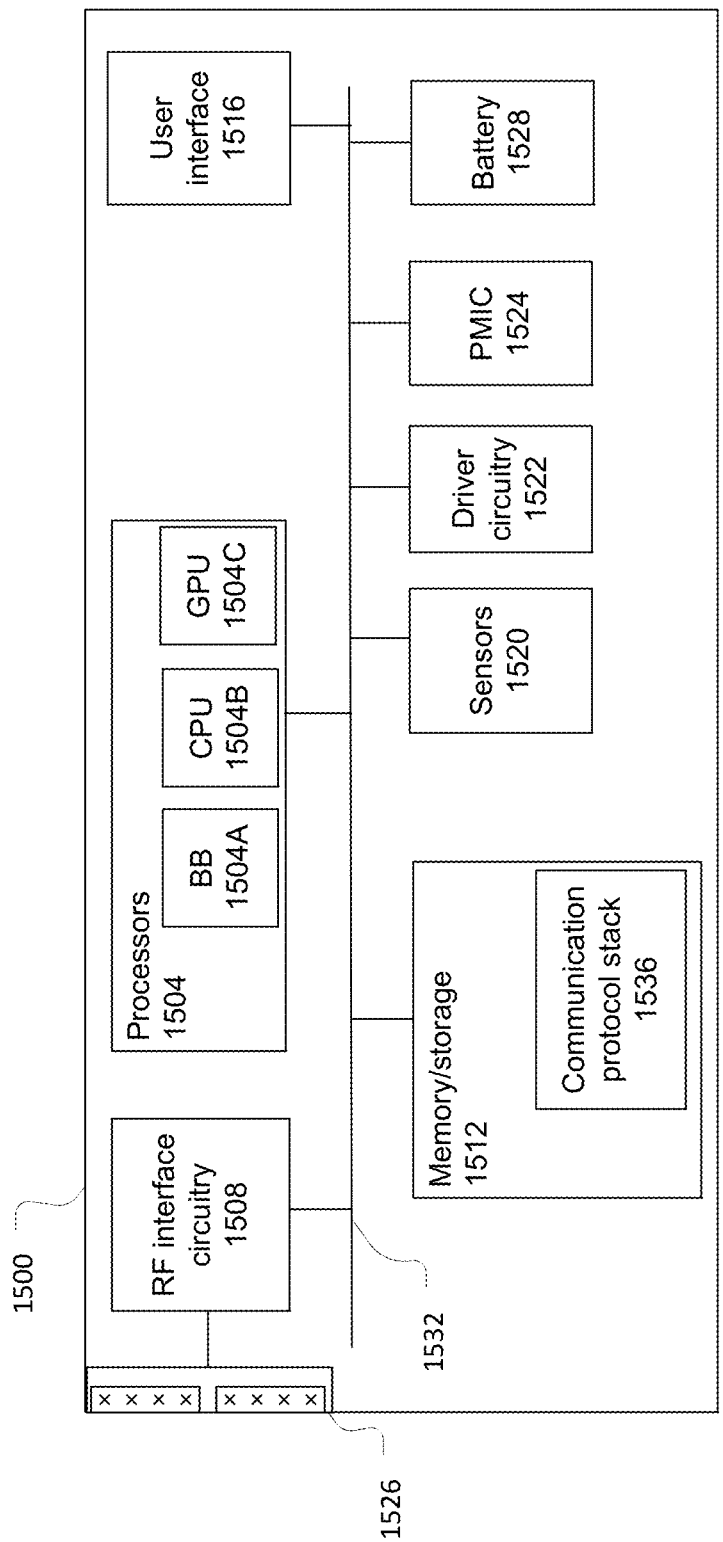
FIG. 15 illustrates a user equipment in accordance with some embodiments.

FIG. 15 illustrates a UE 1500 in accordance with some embodiments. The UE 1500 may be similar to and substantially interchangeable with UE 104 of FIGS. 1 and 2.

The UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1500 may include processors 1504, RF interface circuitry 1508, memory/storage 1512, user interface 1516, sensors 1520, driver circuitry 1522, power management integrated circuit (PMIC) 1524, antenna structure 1526, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1512 may include one or more non-transitory, computer-readable media that includes instructions (for example, communication protocol stack 1536) that may be executed by one or more of the processors 1504 to cause the UE 1500 to perform various operations described herein. The memory/storage 1512 include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1508 may include transceiver circuitry and radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1526 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1526.

In various embodiments, the RF interface circuitry 1508 may be configured to transmit/receive signals in a manner compatible with NR access technologies.

The antenna 1526 may include antenna elements to convert electrical signals into radio waves to travel through the air and to convert received radio waves into electrical signals. The antenna elements may be arranged into one or more antenna panels. The antenna 1526 may have antenna panels that are omnidirectional, directional, or a combination thereof to enable beamforming and multiple input, multiple output communications. The antenna 1526 may include microstrip antennas, printed antennas fabricated on the surface of one or more printed circuit boards, patch antennas, phased array antennas, etc. The antenna 1526 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500 including DRX as discussed herein.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
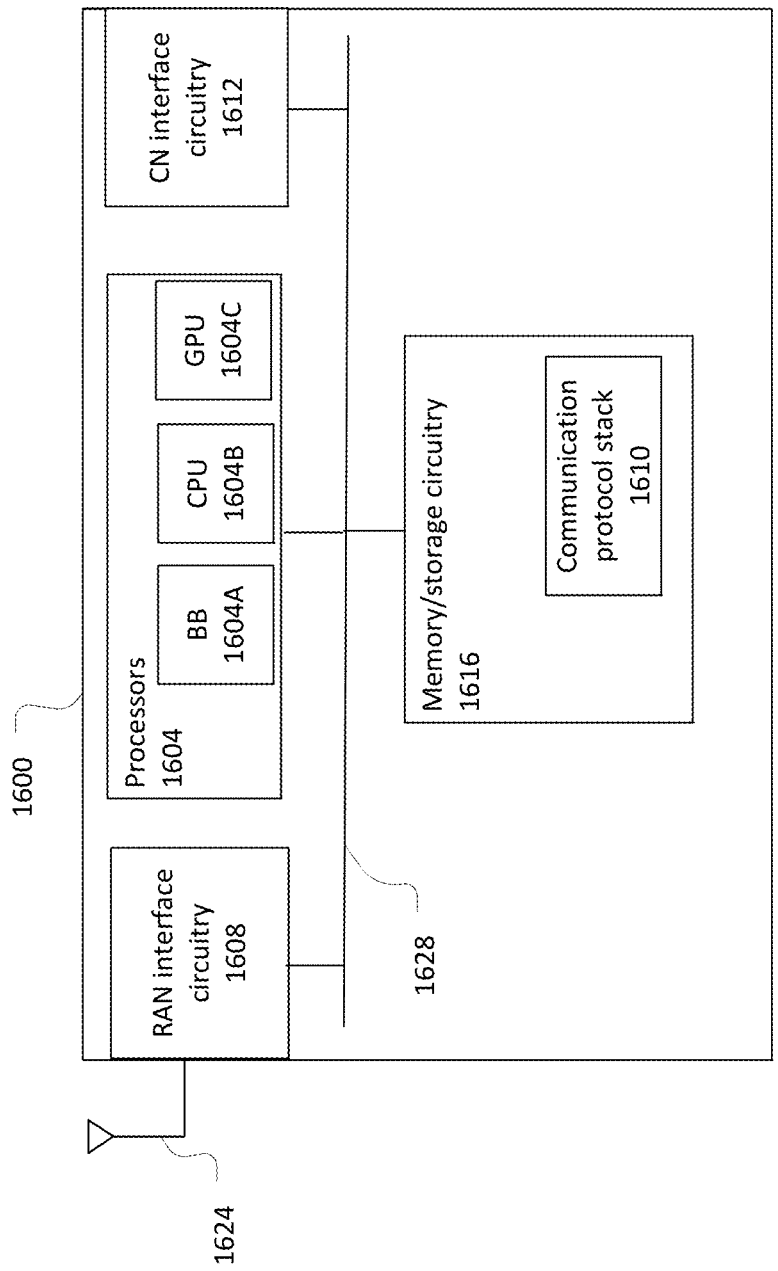
FIG. 16 illustrates an access node in accordance with some embodiments.

FIG. 16 illustrates an access node 1600 (e.g., a gNB) in accordance with some embodiments. The access node 1600 may similar to and substantially interchangeable with access node 108, 208, and/or 210.

The access node 1600 may include processors 1604, RF interface circuitry 1608, core network (CN) interface circuitry 1612, memory/storage circuitry 1616, and antenna structure 1626.

The components of the access node 1600 may be coupled with various other components over one or more interconnects 1628.

The processors 1604, RF interface circuitry 1608, memory/storage circuitry 1616 (including communication protocol stack 1610), antenna structure 1626, and interconnects 1628 may be similar to like-named elements shown and described with respect to FIG. 14.

The CN interface circuitry 1612 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the access node 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method comprising: receiving at least one configuration parameter for a secondary serving cell (SCell); receiving a command to activate the SCell; and determining that the at least one configuration parameter does not include an absoluteFrequencySSB parameter, wherein if the UE does not support scellWithoutSSB capability, the method further comprises causing the UE to quit an activation procedure for the SCell [cases 5 and 6]; and wherein if the UE does support scellWithoutSSB capability, the method further comprises causing the UE to: if a suitable active serving cell is on a same band as the SCell, utilize timing tracking information, frequency tracking information, or automatic gain control (AGC) information from the active serving cell to connect with the SCell; and if no suitable active serving cell is on a same band as the SCell, quit an activation procedure for the SCell.

Example 2 includes the method of example 1 or some other example herein, wherein the same band is in Frequency Range 2 (FR2), and the method further comprises causing the UE to determine whether an active serving cell on the same band as the SCell is a suitable active serving cell based on whether at least one reference signal (RS) of the SCell has a QCL-TypeD relation with at least one RS of the active serving cell.

Example 3 includes the method of example 1 or some other example herein, wherein the same band is in Frequency Range 1 (FR1), and the method further comprises causing the UE to determine whether an active serving cell on the same band as the SCell is a suitable active serving cell based on whether the active serving cell is contiguous to the SCell.

Example 4 includes the method of example 3 or some other example herein, wherein the causing the UE to determine whether an active serving cell on the same band as the SCell is a suitable active serving cell comprises causing the UE to determine whether the active serving cell is a suitable active serving cell further based on: whether at least one reference signal (RS) of the SCell has a QCL-TypeA relation with at least one tracking reference signal (TRS) of the SCell, and whether the at least one TRS of the SCell has a QCL-TypeC relation with at least one Synchronization Signal Block (SSB) of the active serving cell. Such conditions may also include whether the receive timing difference between the SCell and the active serving cell is less than or equal to 260 ns and/or whether the reception power difference between the SCell and the active serving cell is smaller than or equal to 6 dB.

Example 5 includes the method of example 1 or some other example herein, wherein the at least one configuration parameter includes a Synchronization Signal (SS)/Physical Broadcast Channel (PBCH) Block Measurement Timing Configuration (SMTC), and the method further comprising causing the UE to ignore the SMTC.

Example 6 includes the method of example 1 or some other example herein, wherein the at least one configuration parameter does not include any Synchronization Signal (SS)/Physical Broadcast Channel (PBCH) Block Measurement Timing Configuration (SMTC), and the method further comprises causing the UE to ignore a default SMTC.

Example 7 includes the method of any of examples 1-6 or some other example herein, wherein the UE does support scellWithoutSSB capability.

Example 8 includes a method comprising: receiving at least one configuration parameter for a secondary serving cell (SCell); receiving a command to activate the SCell; and determining that the at least one configuration parameter includes an absoluteFrequencySSB parameter and does not include a Synchronization Signal (SS)/Physical Broadcast Channel (PBCH) Block Measurement Timing Configuration (SMTC), wherein, in response to the determining, an activation time for the SCell is based on a time to an end of a first complete SSB burst within an SSB periodicity indicated by an ssb-periodicityServingCell parameter received by the UE.

Example 9 includes the method of Example 8 or some other example herein, wherein the method further comprises sending a channel state report for the SCell within a period that is based on the activation time.

Example 10 includes the method of Example 8 or some other example herein, wherein the method further comprises decoding, within a period for medium access control (MAC) decoding, a MAC control element (CE) that includes the command to activate the SCell, and wherein the activation time includes the period for MAC decoding.

Example 11 includes the method of Example 8 or some other example herein, wherein the activation time is further based on an occasion when the SCell and all active serving cells on the same band as the SCell are transmitting SSB bursts on the same symbols.

Example 12 includes a method of operating a base station, the method comprising: detecting a capability of a user equipment (UE) to support secondary serving cell (SCell) operation without synchronization signal and physical broadcast channel block (SSB); generating configuration information for an SCell based on the capability; transmitting the configuration information to the UE; and sending an activation command for the SCell to the UE.

Example 13 includes the method of Example 12 or some other example herein, wherein the transmitting comprises, based on a determination that the UE lacks capability to support scellWithoutSSB, transmitting the configuration information to include an absoluteFrequencySSB parameter for the SCell.

Example 14 includes the method of Example 12 or some other example herein, wherein the transmitting comprises, based on a determination that the UE has capability to support scellWithoutSSB, transmitting the configuration information to include no absoluteFrequencySSB parameter for the SCell.

Example 15 includes the method of Example 14 or some other example herein, wherein the transmitting comprises, based on the determination that the UE has capability to support scellWithoutSSB, transmitting the configuration information to include no Synchronization Signal (SS)/Physical Broadcast Channel (PBCH) Block Measurement Timing Configuration (SMTC) for the SCell.

Example 16 includes the method of Example 12 or some other example herein, wherein the configuration information does not include an absoluteFrequencySSB parameter for the SCell and does include a Synchronization Signal (SS)/Physical Broadcast Channel (PBCH) Block Measurement Timing Configuration (SMTC) for the SCell.

Example 17 includes the method of Example 12 or some other example herein, wherein the configuration information includes an absoluteFrequencySSB parameter for the SCell and a Synchronization Signal (SS)/Physical Broadcast Channel (PBCH) Block Measurement Timing Configuration (SMTC) for the SCell.

Example 18 includes the method of Example 12 or some other example herein, wherein the configuration information includes an absoluteFrequencySSB parameter for the SCell and does not include any Synchronization Signal (SS)/Physical Broadcast Channel (PBCH) Block Measurement Timing Configuration (SMTC) for the SCell.

Example 19 includes a method of operating a base station, the method comprising: sending an activation command to a user equipment to activate a secondary serving cell (SCell); determining a time to an end of a first complete synchronization signal and physical broadcast channel block (SSB) burst within an SSB periodicity indicated by a configuration parameter transmitted within a system information block (SIB) of the SCell or within a pre-defined SSB periodicity; determining an SCell activation window based on the time to the end of the first complete SSB burst; and monitoring, within the SCell activation window, an uplink channel to detect a channel state information (CSI) report from the UE based on the activation command.

Example 20 includes the method of Example 19 or some other example herein, the method further comprising determining a second time to an end of a first complete SSB burst based on an occasion when the SCell and all active serving cells on the same band as the SCell are transmitting SSB bursts on the same symbols.

Example 21 includes a method of operating a network, the method comprising: configuring a secondary serving cell (SCell) without a synchronization signal and physical broadcast channel (SSB), wherein the secondary serving cell is on a component carrier; and configuring the component carrier without an SSB measurement and timing configuration (SMTC).

Example 22 includes the method of Example 21 or some other example herein, wherein the SCell is a first SCell, the component carrier is a first component carrier, and the method further comprises: configuring a second SCell on a second component carrier with an SSB; and configuring the second component carrier with an SMTC.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a datagram, information element, packet, frame, segment, PDU, or message as described in or related to any of examples 1-22, or portions or parts thereof, or otherwise described in the present disclosure.

Example 30 may include a signal encoded with data as described in or related to any of examples 1-22, or portions or parts thereof, or otherwise described in the present disclosure.

Example 31 may include a signal encoded with a datagram, IE, packet, frame, segment, PDU, or message as described in or related to any of examples 1-22, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 33 may include a computer program comprising instructions, wherein execution of the program by a processing element is to cause the processing element to carry out the method, techniques, or process as described in or related to any of examples 1-22, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that are to be executed to cause processing circuitry to:
   determine, by a user equipment (UE), that configuration information for a secondary serving cell (SCell) does not include an absolute frequency synchronization signal block (SSB) (absoluteFrequencySSB) parameter;
   identify a command to activate the SCell;
   determine, based on determination that the configuration information does not include the absolute FrequencySSB parameter, a first reference signal of the SCell is associated with a second reference signal of an active serving cell that is on a same band as the SCell; and activate the SCell based on determination that the first reference signal is associated with the second reference signal.

2. The one or more non-transitory computer-readable media of claim 1, wherein the same band is in Frequency Range 2 (FR2), and the instructions that are to be executed are to further cause the processing circuitry to determine that at least one reference signal (RS) of the SCell has a QCL-TypeD relation with at least one RS of the active serving cell.

3. The one or more non-transitory computer-readable media of claim 1, wherein the same band is in a Frequency Range 1 (FR1), and the instructions that are to be executed are to further cause the processing circuitry to determine that the active serving cell on the same band as the SCell is contiguous to the SCell on the FR1.

4. The one or more non-transitory computer-readable media of claim 3, wherein the instructions that are to be executed are to further cause the processing circuitry to further determine:

that at least one reference signal (RS) of the SCell has a QCL-TypeA relation with at least one tracking reference signal (TRS) of the SCell;

that the at least one TRS of the SCell has a QCL-TypeC relation with at least one SSB of the active serving cell;

that a receive timing difference between the SCell and the active serving cell is less than or equal to 260 ns; and that a reception power difference between the SCell and the active serving cell is smaller than or equal to 6 dB.

5. The one or more non-transitory computer-readable media of claim 1, wherein the configuration information includes a Synchronization Signal (SS)/Physical Broadcast Channel (PBCH) Block Measurement Timing Configuration (SMTC), and the instructions that are to be executed are to further cause the processing circuitry to ignore the SMTC.

6. The one or more non-transitory computer-readable media of claim 1, wherein the configuration information does not include any Synchronization Signal (SS)/Physical Broadcast Channel (PBCH) Block Measurement Timing Configuration (SMTC), and the instructions that are to be executed are to further cause the processing circuitry to ignore a default SMTC.

7. The one or more non-transitory computer-readable media of claim 1, wherein the UE supports a SCell without SSB (scellWithoutSSB) capability, and the determination of association between the reference signals is a determination of a quasi-co-location (QCL) relationship.

8. A method comprising:

detecting a capability of a user equipment (UE) to support secondary serving cell (SCell) operation without synchronization signal and physical broadcast channel block (SSB) (scellWithoutSSB);

determining, based on the capability of the UE, that the UE supports scellWithoutSSB;

generating configuration information for an SCell based on the capability, wherein the configuration information does not include an absolute frequency SSB (absoluteFrequencySSB) parameter for the SCell; and generating an activation command for the SCell to be transmitted to the UE.

9. The method of claim 8, wherein the configuration information does not include Synchronization Signal (SS)/Physical Broadcast Channel (PBCH) Block Measurement Timing Configuration (SMTC) for the SCell.

10. The method of claim 8, wherein includes a Synchronization Signal (SS)/Physical Broadcast Channel (PBCH) Block Measurement Timing Configuration (SMTC) for the SCell.

11. The method of claim 8, the method further comprising:

determining a time to an end of a first complete SSB burst within an SSB periodicity indicated by a configuration parameter transmitted within a system information block (SIB) of the SCell or within a pre-defined SSB periodicity;

determining an SCell activation window based on the time to the end of the first complete SSB burst; and monitoring, within the SCell activation window, an uplink channel to detect a channel state information (CSI) report from the UE based on the activation command.

12. The method of claim 11, the method further comprising determining a second time to an end of a first complete SSB burst based on an occasion when the SCell and all active serving cells on the same band as the SCell are transmitting SSB bursts on the same symbols.

13. An apparatus comprising:

processing circuitry configured to:

determine, by a user equipment (UE), that configuration information for a secondary serving cell (SCell) does not include an absolute frequency synchronization signal block (SSB) (absoluteFrequencySSB) parameter;

identify a command to activate the SCell;

determine, based on determination that the configuration information does not include the absoluteFrequencySSB parameter, a first reference signal of the SCell is associated with a second reference signal of an active serving cell that is on a same band as the SCell; and activate the SCell based on determination that the first reference signal is associated with the second reference signal; and memory interface circuitry, coupled with the processing circuitry, to store the configuration information in memory.

14. The apparatus of claim 13, wherein the same band is in Frequency Range 2 (FR2), and the processing circuitry is further configured to:

determine that at least one reference signal (RS) of the SCell has a QCL-TypeD relation with at least one RS of the active serving cell.

15. The apparatus of claim 13, wherein the same band is in a Frequency Range 1 (FR1), and the processing circuitry is further configured to:

determine that the active serving cell on the same band as the SCell is contiguous to the SCell on the FR1.

16. The apparatus of claim 15, wherein the processing circuitry is further configured to determine:

that at least one reference signal (RS) of the SCell has a QCL-TypeA relation with at least one tracking reference signal (TRS) of the SCell;

that the at least one TRS of the SCell has a QCL-TypeC relation with at least one Synchronization Signal Block (SSB) of the active serving cell;

that a receive timing difference between the SCell and the active serving cell is less than or equal to 260 ns; and that a reception power difference between the SCell and the active serving cell is smaller than or equal to 6 dB.

17. The apparatus of claim 13, wherein the configuration information includes a Synchronization Signal (SS)/Physical Broadcast Channel (PBCH) Block Measurement Timing Configuration (SMTC), and the processing circuitry is further configured to ignore the SMTC.

18. The apparatus of claim 13, wherein the configuration information does not include any Synchronization Signal (SS)/Physical Broadcast Channel (PBCH) Block Measurement Timing Configuration (SMTC), and the processing circuitry is further configured to ignore a default SMTC.

19. The apparatus of claim 13, wherein the UE supports a SCell without SSB (scellWithoutSSB) capability, and the determination of association between the reference signals is a determination of a quasi-co-location (QCL) relationship.

* * * * *